(12) United States Patent
DeSanti et al.

(10) Patent No.: US 7,512,123 B1
(45) Date of Patent: Mar. 31, 2009

(54) FIBRE CHANNEL FABRIC AND SWITCHES WITH FLEXIBLE PREFIX ADDRESSING

(75) Inventors: Claudio DeSanti, San Jose, CA (US); Silvano Gai, San Jose, CA (US); Dante Malagrino, Mountain View, CA (US); Dinesh G. Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 786 days.

(21) Appl. No.: 10/778,672

(22) Filed: Feb. 13, 2004

Related U.S. Application Data

(60) Provisional application No. 60/488,116, filed on Jul. 16, 2003.

(51) Int. Cl.
*H04L 12/28* (2006.01)
(52) U.S. Cl. .................. 370/389; 370/401; 370/470
(58) Field of Classification Search .................. None
See application file for complete search history.

(56) References Cited

U.S. PATENT DOCUMENTS

| | | | | |
|---|---|---|---|---|
| 2002/0034178 A1* | 3/2002 | Schmidt et al. | ............. | 370/386 |
| 2002/0191615 A1* | 12/2002 | Paul et al. | ................. | 370/395.1 |
| 2006/0034302 A1* | 2/2006 | Peterson | ..................... | 370/401 |

OTHER PUBLICATIONS

DeSanti, Claudio, "Classless FC_Ids T1/03-526v1", Internal Paper, Andiamo Systems, 2003, 30 pages.

Brocade, "Inter-Fabric Fibre Channel Architecture", Internal Paper, 7 pages.

Guan et al., "Inter-Fabric FC Architecture", Internal Paper, Brocade, May 30, 2003, 10 pages.

Guan et al., "Inter-Fabric Fibre Channel Architecture", Internal Paper, Brocade, Apr. 6, 2004, 6 pages.

* cited by examiner

*Primary Examiner*—Duc C Ho
(74) *Attorney, Agent, or Firm*—Weaver Austin Villeneuve & Sampson LLP

(57) ABSTRACT

A way to assign flexible prefixes to Switches in Fiber Channel Fabrics while using the currently defined FC_ID address space. This allows end devices in different Fiber Channel Fabrics to communicate with one another, without requiring modifications to existing end devices, nor to perform Network Address Translation between Fabrics. The existing address space for each Switch includes a dynamically configurable number of host bits sufficient to address all the end devices coupled to the Switch and the Switch itself. The remaining bits, called the Switch prefix, are used to identify the Switch in the switching Fabric. In an alternative embodiment, the Switch prefix bits may be further configured into a first sub-set of bits used to identify a specific Fabric (Fabric prefix) and a second sub-set of bits used to identify the Switch in the Fabric (Switch_ID). The flexible addressing scheme enables end devices in different Fabrics to communicate with one another without expanding the Fiber Channel address space or the need to perform Network Address Translations.

20 Claims, 8 Drawing Sheets

| Domain_ID | Port |
|---|---|
| 1 (SW1) | Self |
| 2 (SW2) | Port A |
| 3 (SW3) | Port B |

FIG. 1C

| Prefix | Internal/External | Port |
|---|---|---|
| 0000 0001 0000 0000 0000 1 (SW1) | I | Self |
| 0000 0001 0000 0000 0001 (SW2) | I | Port A |
| 0000 0001 0000 0000 01 (SW3) | I | Port B |

| Prefix | Port |
|---|---|
| 0000 0001 0000 0000 0000 1 (SW1) | Self |
| 0000 0001 0000 0000 0001 (SW2) | Port A |
| 0000 0001 0000 0000 01 (SW3) | Port B |

FIG. 5B

| Prefix | Fabric | Port |
|---|---|---|
| 0000 0001 0000 0000 0000 1 (SW1) | F1 | Port A |
| 0000 0001 0000 0000 0001 (SW2) | F1 | Port A |
| 0000 0001 0000 0000 01 (SW3) | F1 | Port A |
| 0000 0001 0000 0000 10 (SWx) | F1 | Self |
| 0000 0010 0000 0000 0000 1 (SW4) | F2 | Port B |
| 0000 0010 0000 0000 0001 (SW5) | F2 | Port B |
| 0000 0010 0000 0000 01 (SW6) | F2 | Port B |
| 0000 0010 0000 0000 10 (SWx) | F2 | Self |

*FIG. 7A*

| Prefix | Port |
|---|---|
| 0000 0001 0000 0000 0000 1 (SW1) | Port A |
| 0000 0001 0000 0000 0001 (SW2) | Port A |
| 0000 0001 0000 0000 01 (SW3) | Port A |
| 0000 0001 0000 0000 10 (SWx) | Self |
| 0000 0010 0000 0000 0000 1 (SW4) | Port B |
| 0000 0010 0000 0000 0001 (SW5) | Port B |
| 0000 0010 0000 0000 01 (SW6) | Port B |
| 0000 0010 0000 0000 10 (SWx) | Self |

*FIG. 7B*

| Prefix | Internal/External | Port |
|---|---|---|
| 0000 0001 0000 0000 0000 1 (SW1) | I | Self |
| 0000 0001 0000 0000 0001 (SW2) | I | Port a |
| 0000 0001 0000 0000 01 (SW3) | I | Port b |
| 0000 0001 0000 0000 10 (SWx) | I | Port b |
| 0000 0010 0000 0000 0000 1 (SW4) | E | Port b |

*FIG. 7C*

| Prefix | Internal/External | Port |
|---|---|---|
| 0000 0010 0000 0000 0000 1 (SW4) | I | Self |
| 0000 0010 0000 0000 0001 (SW5) | I | Port a |
| 0000 0010 0000 0000 01 (SW6) | I | Port b |
| 0000 0010 0000 0000 10 (SWx) | I | Port b |
| 0000 0001 0000 0000 0000 1 (SW1) | E | Port b |

*FIG. 7D*

FIBRE CHANNEL FABRIC AND SWITCHES WITH FLEXIBLE PREFIX ADDRESSING

BACKGROUND OF THE INVENTION

1. Field of the Invention

The present invention relates generally to networks, and more particularly to a way to assign flexible prefixes to Switches in Fibre Channel Fabrics while using the currently defined FC_ID address space. This allows end devices in different Fibre Channel Fabrics to communicate with one another, without requiring modifications to existing end devices, or the need to perform Network Address Translation between Fabrics.

2. Description of the Related Art

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.90, International Committee for Information Technology Standards (INCITS), Apr. 9, 2003, and the Fibre Channel Switch Fabric-2, Rev. 5.4, INCITS, Jun. 26, 2001, and the Fibre Channel Generic Services-3, Rev. 7.01, INCITS, Nov. 28, 2000, all incorporated by reference herein for all purposes.

In a Fabric, each Host and storage device is identified by a three byte-wide Fibre Channel address, also called FC_ID. Today the address is statically subdivided in three fields denoted Domain_ID, Area_ID, and Port_ID, each one byte long respectively. Within a Fabric, each Switch is assigned a Domain_ID. The end devices attached to a particular Switch are assigned a FC_ID having the Domain_ID of that Switch. The Switch manages the allocation of the Area_ID and Port_ID fields for each end device to guarantee the uniqueness of the assigned addresses in that Domain_ID. For example, if a Switch is assigned a Domain_ID number five and the Switch subdivides its address space in two areas each having three connected end devices, then a possible Fibre Channel address FC_ID allocation is: 5:1:1, 5:1:2, 5:1:3, 5:2:1, 5:2:2, and 5:2:3 respectively.

Fibre Channel frames are used for communication between Hosts and storage devices within a Fabric. A Fibre Channel frame header carries the source and destination Fibre Channel addresses. When a Host wishes to access a storage device, the FC_IDs of the Host and the storage device are inserted into the source and destination fields of the header respectively. The Switches within the Fabric then route the frame to the target end device using the destination FC_ID. The target end device generates a response frame that includes its own FC_ID in the source field and the FC_ID of the Host in the destination field. The frame is then routed across the Fabric in a similar manner as that described above.

The information infrastructure within a large enterprise typically has a number of independent Fabrics, each dedicated to a different organization or application within the enterprise. For example, a large corporation may have Fabrics for the corporate department, sales organization, engineering group, etc. Each Fabric is separate and distinct. The Hosts of one Fabric cannot access or use a resource in another Fabric.

The aforementioned arrangement has a number of disadvantages. The Hosts in a given Fabric can communicate only with the storage devices in that same Fabric. Typically there is no way that a Host in one Fabric can communicate with a storage device in a second Fabric. This arrangement is not only inefficient, it is expensive. Since storage devices cannot be shared among Fabrics, separate storage devices are required for each Fabric.

On occasion, it is desirable for resources to be shared across Fabrics, while keeping the Fabrics separate. For example, it may be convenient for a Host in a first Fabric to be able to access a tape drive in a second Fabric. Fibre Channel Fabrics maintain, in operation, several kinds of information, such as the Name Server database, or the Fabric Configuration Server database, or the Zoning database. In addition, Fibre Channel Fabrics notify end devices of any relevant change in the state of the Fabric itself and of other end devices. There are a number of reasons to interconnect different Fabrics without merging them into a single Fabric. The above mentioned databases typically grow more than linearly with the size of a Fabric. The size of the databases is therefore a limiting factor in the size of a given Fabric. Also the notification mechanism does not scale to big Fabrics. Interconnecting separate Fabrics allows confining the above mentioned databases and notifications inside each Fabric, to keep them manageable, while inter-Fabric protocols may allow communication between selected end devices across multiple Fabrics. A number of solutions to enable resource sharing have been proposed.

One proposed solution involves the virtualization of the end devices so that there are "local instances" of each end device in each Fabric. See for example US Patent Publication 2003/0012204. With this approach, a gateway is needed to couple two (or more) Fabrics. The gateway is required to perform FC_ID translations (i.e., Network Address translations or NATs) for the source and destination end devices. Several problems are associated with NAT translations. If the gateway that performs the translations fails, an alternative or fail-over path across a second gateway needs to be created. The second gateway must have the same state information of the failed gateway. This requires a great deal of management by the Fabric administrator. In addition, with certain FC frames, both the source and/or destination FC_IDs may be carried in the frame payload. A mechanism that identifies and translates these FC_IDs must therefore be provided. This solution also does not work if encryption or a proprietary protocol is used between the source and destination end devices because there is no way for the translating gateway to process the proprietary payloads or decrypt the frames to identify the source and destination FC_IDs possibly carried inside the payload. While in certain cases this approach may be enough, in the general case, the management overhead of this proposal is highly burdensome and is very not practical.

Another proposed solution is the extension of the address space beyond the current three bytes to include the addition of a source Fabric_ID field and a destination Fabric_ID. During communication, the source and destination Fabric_IDs are specified in the FC frame header along with the source and destination FC_IDs. While this proposal eliminates the NAT translation, it is also impractical because it is not backward compatible with existing networking infrastructure. Existing Switches and end devices do not recognize Fabric_IDs. To implement this solution, an entirely new networking infrastructure that supports the use of Fabric_IDs would be needed. In particular, not only the Switches, but also all the end devices need to be replaced. This solution is therefore extremely impractical.

A way to assign flexible prefixes to Switches in Fibre Channel Fabrics while using the currently defined FC_ID address space is therefore desired, in order to allow end devices in different Fibre Channel Fabrics to communicate with one another, without requiring modifications to existing end devices, or the need to perform Network Address Translation between Fabrics.

SUMMARY OF THE INVENTION

The present invention relates to a way to assign flexible prefixes to Switches in Fibre Channel Fabrics while using the currently defined FC_ID address space. This allows end devices in different Fibre Channel Fabrics to communicate with one another, without requiring modifications to existing end devices, or the need to perform Network Address Translation between Fabrics. With the present invention, the existing address space for each Switch includes a dynamically configurable number of host bits sufficient to address all the end devices coupled to the Switch and the Switch itself. The remaining bits, called the Switch prefix, are used to identify the Switch in the switching Fabric. In an alternative embodiment, the Switch prefix bits may be further divided into a configurable first sub-set of bits used to identify a specific Fabric (Fabric prefix) and a second configurable sub-set of bits used to identify the Switch in the Fabric (Switch_ID). Thus the flexible addressing scheme of the present invention enables end devices in different Fabrics to communicate with one another without expanding the Fibre Channel address space or the need to perform Network Address Translations.

BRIEF DESCRIPTION OF THE DRAWINGS

The invention may best be understood by reference to the following description taken in conjunction with the accompanying drawings in which:

FIG. 1C is a table illustrating the forwarding table of a current Switch;

FIG. 5A is a diagram of a routing table which facilitates Switch-to-Switch, intra-Fabric communication according to the present invention;

FIG. 5B is a table illustrating a forwarding table for a Switch built according to the present invention;

FIG. 7A is a diagram of the routing table required by a Gateway facilitating inter-Fabric communication according to the present invention;

FIG. 7B is a diagram of the forwarding table required by a Gateway facilitating inter-Fabric communication according to the present invention;

FIGS. 7C and 7D are diagrams of routing tables of Switches supporting both intra-Fabric and inter-Fabric communication according to the present invention.

DETAILED DESCRIPTION OF THE PREFERRED EMBODIMENTS

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

Figure 1A:
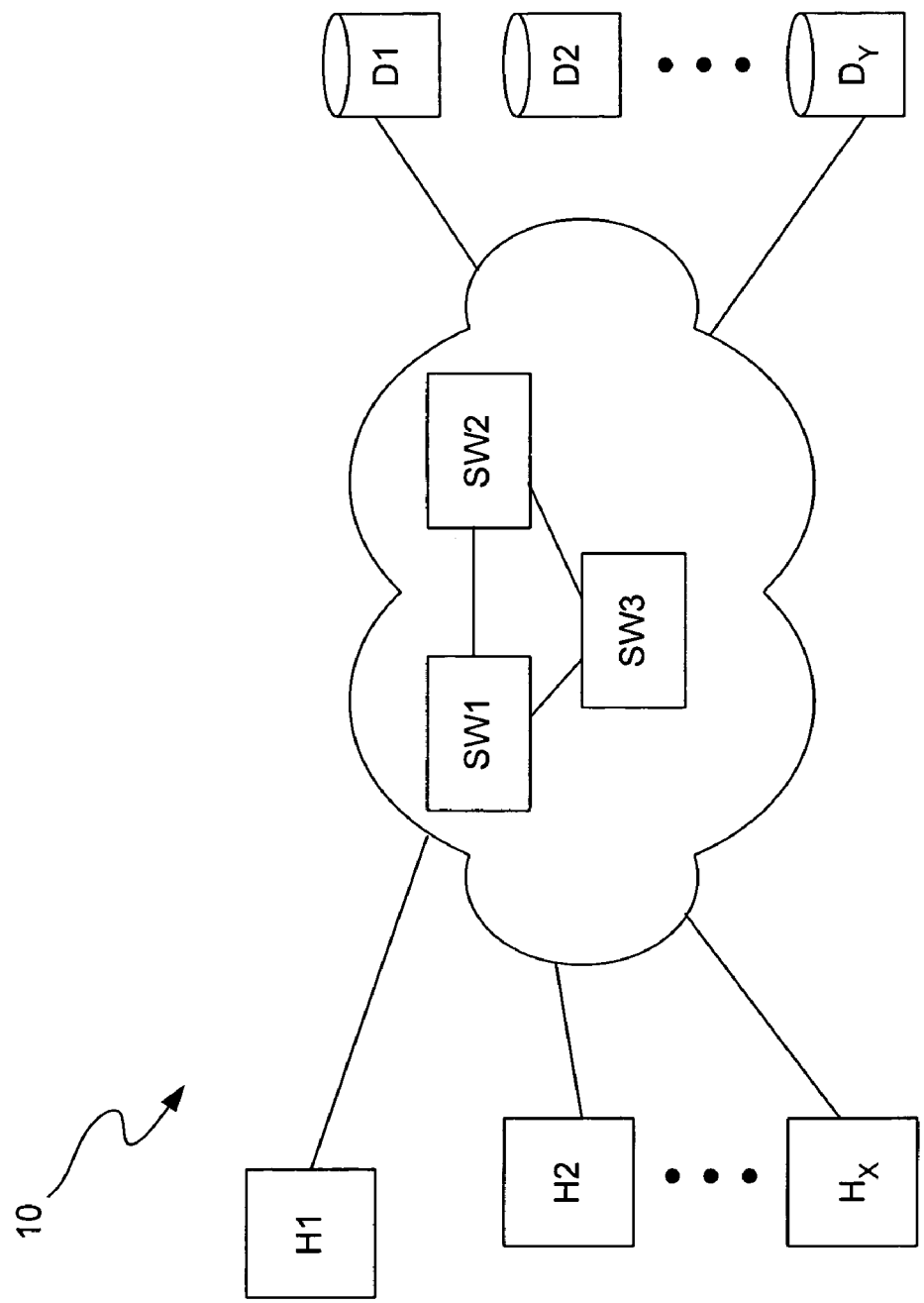
FIG. 1A is a diagram of a Fibre Channel Fabric according to the present invention.

Referring to FIG. 1A, a diagram of a Fibre Channel Fabric according to the present invention is shown. The Fabric 10 includes three Switches SW1, SW2, and SW3, a plurality of Hosts labeled H1 through Hx, and a plurality of storage devices D1 through Dy. According to various embodiments of the invention, the Hosts can be any type of Host including but not limited to servers or personal computers running either the Unix, Windows or any other operating system. Similarly, the storage devices D can be any type of storage device including but not limited to tape back-up systems, emulated tape back-up systems, CD-ROM storage arrays, or one or more disks such as a Redundant Array of Independent Disks (RAID). The Switches SW1-SW3 can be any type of Fibre Channel Switch such as those commercially available from Cisco Systems of San Jose, Calif. or Andiamo Systems, the assignee of the present application. It should be noted that the number and types of Hosts H, storage devices D, and Switches SW, and their particular arrangement as shown is merely illustrative. In no way should this example be construed as limiting the invention.

Under the current Fibre Channel practice and standards, the Domain_ID, Area_ID and Port_ID sub-division of the FC_ID assigned to each end device is statically set. In other words, the 24 bits of the address space are divided so that the first byte is used to identify the Domain_ID of the Switch and the second and third bytes are used to identify a particular end device connected to the Switch. Since the address space allocated for Area_IDs and Port_IDs are each eight bits wide, a Switch could potentially address up to ($2^{16}$=65,536) end devices. Since the vast majority of Switches connect 16 or 32 end devices in a typical Fabric, and the biggest Switches have today up to 256 ports at most, the current static address space allocation scheme is terribly inefficient.

Figure 1B:
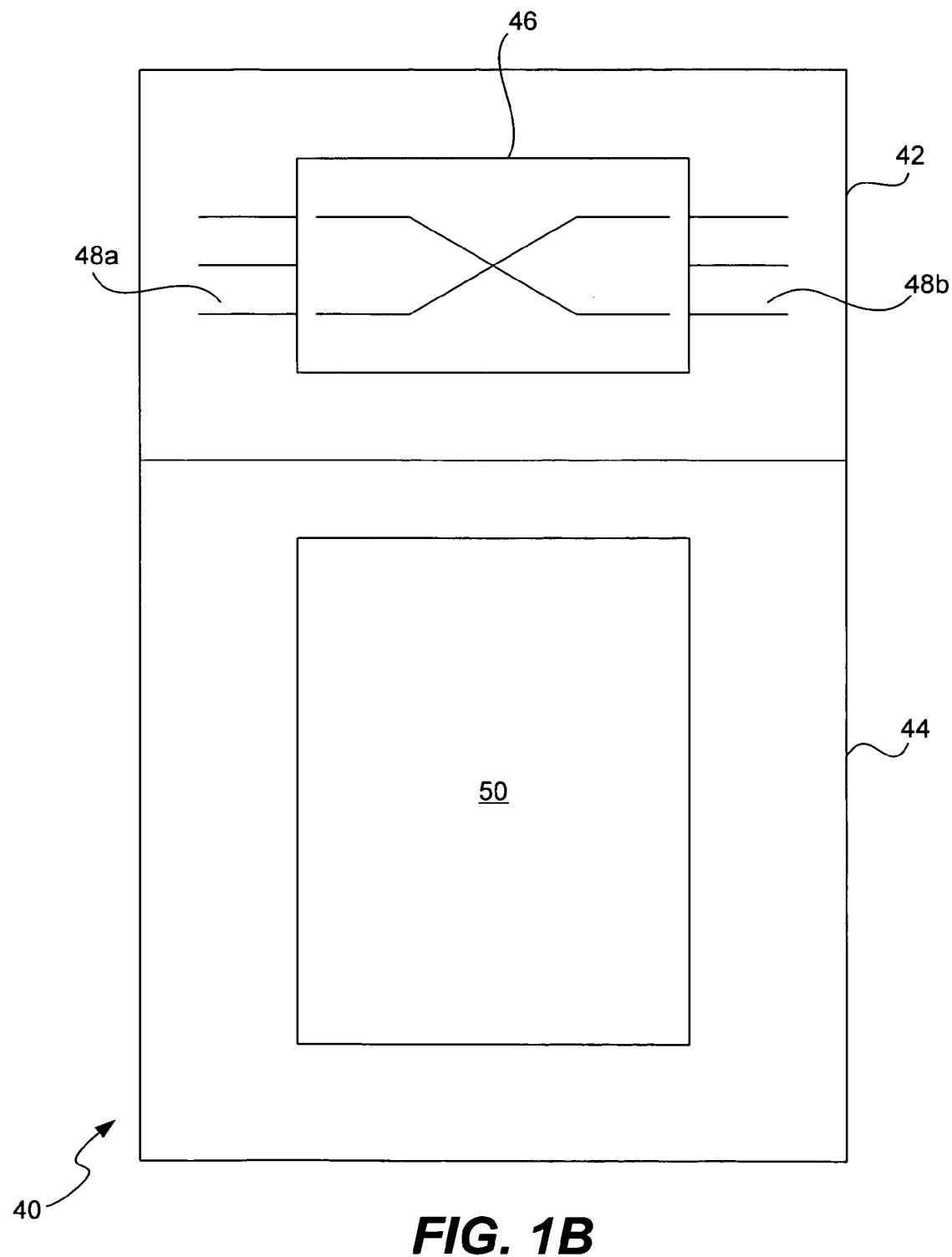
FIG. 1B is a block diagram of a current Switch or of a Switch built according to the present invention.

Referring to FIG. 1B, a block diagram of a Switch SW is shown. The Switch 40 includes a data plane 42 and a control plane 44. In the data plane 42, the Switch includes switching logic 46 connected between two sets of ports 48a and 48b. The switching logic 46 is configured to route or internally switch traffic received on one port 48a to another port 48b and vice versa. The control plane 44 includes a processor 50 for implementing all the switching Fibre Channel functionality and protocols such as those specified in the INCITS documents mentioned herein.

With the current model of address allocation, to each of the Switches SW1, SW2 and SW3 is assigned one (or more) Domain_ID(s). A routing protocol, called FSPF, propagates Domain_IDs "reachability" information among the Switches of a Fabric, and allows each Switch to maintain a routing table. Assuming that Switches SW1, SW2, and SW3 of FIG. 1A are associated with Domain_IDs 1, 2, and 3 respectively, FIG. 1C represents an exemplary routing table for Switch SW1. As shown, each Domain_ID is associated with the output port on the best path toward that destination Domain_ID. This routing table maintained by the control plane 44 is encoded in a forwarding table used by the switching logic 46 of FIG. 1B to effectively switch incoming frames. With the current address allocation model the forwarding table has the same form of the routing table represented in FIG. 1C. Given that each Domain_ID has a fixed length (8 bits), the forwarding table may be searched by the switching logic using an exact match algorithm.

With the present invention, the same Switch illustrated in FIG. 1B is used with certain modifications to implement the switching operation as described below. The switching logic 46 is configured to route or internally switch traffic received on one port 48a to another port 48b and vice versa. The control plane 44 includes a processor 50 for implementing all the switching Fibre Channel functionality and protocols such as those specified in the aforementioned INCITS documents, incorporated by reference herein, or any other protocols useful for either intra-Switch or inter-Switch communication. In various embodiments of the invention, the processor 50 may be implemented in a state machine, a micro-controller, hardware, firmware, programmable logic, or a combination thereof.

The present invention contemplates a flexible allocation of the Fibre Channel address space. Specifically, the 24 bits of the FC_ID are divided into host bits and Switch prefix bits in a flexible manner. The number of host bits is configured by the fabric administrator to satisfy the current number of end devices coupled to the Switch. The remaining bits, called the Switch prefix, are used to uniquely identify a Switch. In one embodiment particularly suited for inter-fabric communication, the bits of the prefix can be further configured into two sub-sets. The first sub-set (Fabric prefix) can be used to identify the Fabric to which a Switch belongs. The second sub-set (Switch_ID) can be used to identify a particular Switch within that Fabric. In other words, different Fabrics will have different Fabric prefix values. All the Switches within a single Fabric will have the same Fabric prefix value, but different Switch_ID values.

The number of host bits and Switch prefix bits for a particular Switch is configured by (i): ascertaining the total number of host_IDs needed for the Switch. The number of host_IDs is calculated by adding the number of end devices connected to the Switch plus one host_ID reserved for the Switch itself. As is described in more detail below, a host_ID for the Switch is needed for Switch-to-Switch communication; (ii) reserving the necessary number of host bits required to address each of the total number of host_IDs; and (iii) calculating the number of Switch prefix bits by subtracting the number of reserved host bits from the address width (24 bits). As previously noted, the Switch prefix bits can also be further divided into the Fabric prefix and Switch_ID sub-sets to differentiate Fabrics and the Switches within a Fabric.

Figure 2:
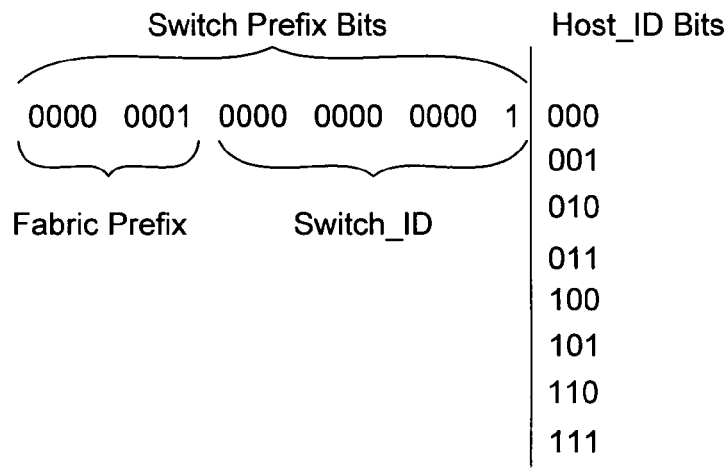
FIG. 2 is a table illustrating the flexible allocation of the address space of a first Switch in the Fibre Channel Fabric according to the present invention.

Referring to FIG. 2, a table illustrating the flexible allocation of the address space for a first Switch SW1 in the Fabric 10 is shown. In this example, a total of seven (7) host_IDs are needed. Six (6) are needed for end devices and one (1) for the Switch SW1. To address the seven host_IDs, a total of three bits of the address is needed ($2^3=8$). Accordingly, the Switch prefix in this instance is twenty one (21) bits long (24−3=21). Of the eight possible addresses designated by the various combinations of the three host bits, six are used to address the end devices and one is used to address the Switch SW1. One address remains unused. The choice of the host_ID identifying a specific Switch must be consistent across the Switches, but the particular value is not relevant. In one embodiment, the selected host_ID is 0 (i.e., all host_ID bits are set to 0) to identify the Switch SW1. In this example, eight of the Switch Prefix Bits are used for the Fabric prefix, having value '0000 0001', and the remaining thirteen bits are used for the Switch_ID, having value '0000 0000 0000 1'

Figure 3:
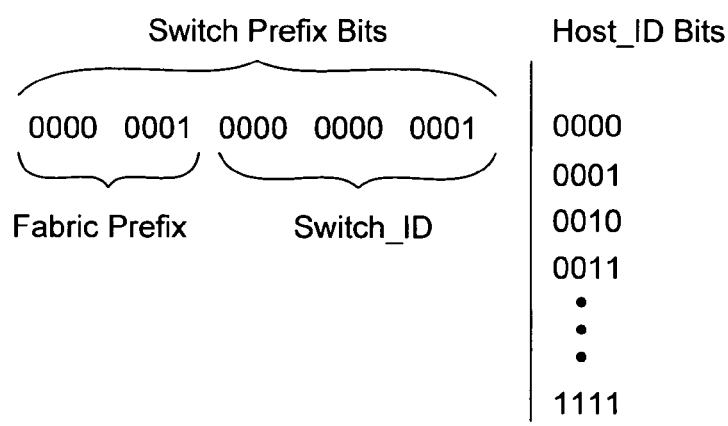
FIG. 3 is a table illustrating the flexible allocation of the address space of a second Switch in the Fibre Channel Fabric according to the present invention.

Referring to FIG. 3, a table illustrating the flexible allocation of the address space for Switch SW2 in the Fabric 10 is shown. In this example, a total of fifteen (15) host_IDs are needed including fourteen (14) for end devices and one (1) for the Switch SW2. To address the fifteen host_IDs, a total of four host bits of the address is needed ($2^4=16$). Accordingly, the Switch Prefix in this instance is twenty (20) bits long (24−4=20). Of the sixteen possible addresses designated by the various combinations of the four host bits, fourteen are used to address the end devices and one (e.g., host_ID 0) is used to address the Switch SW2. One address remains unused. Among the Switch Prefix bits, in this example eight are used for the Fabric prefix, having value '0000 0001', and the remaining twelve are used for the Switch_ID, having value '0000 0000 0001'.

Figure 4:
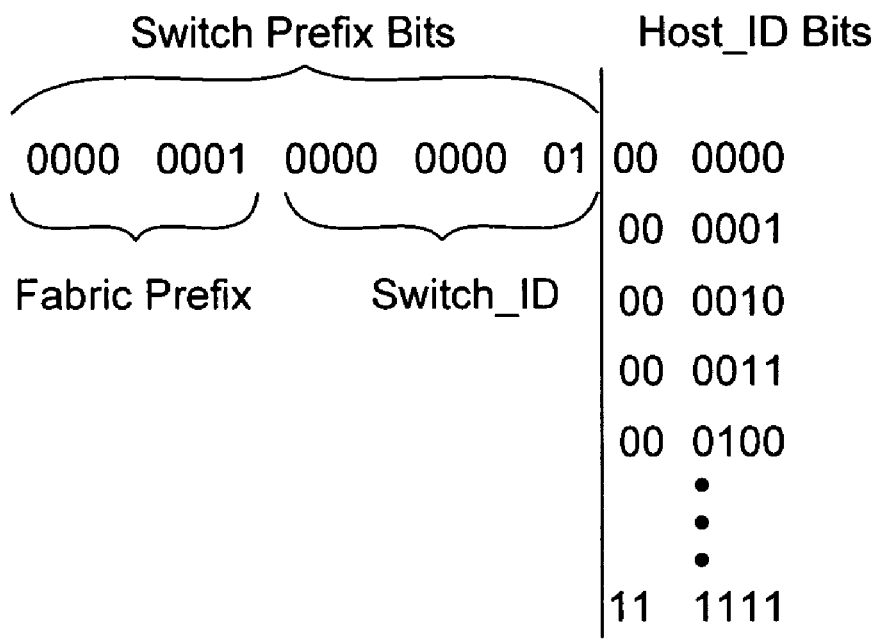
FIG. 4 is a table illustrating the flexible allocation of the address space of a third Switch in the Fibre Channel Fabric according to the present invention.

Referring to FIG. 4, a table illustrating the flexible allocation of the address space for a third Switch SW3 in the Fabric 10 is shown. In this example, a total of thirty nine (39) host_IDs are needed including thirty eight (38) for end devices and one (1) for the Switch SW3. To address thirty nine host_IDs, a total of six bits of the address is needed ($2^6=64$). Accordingly, the Switch Prefix in this instance is eighteen (18) bits long (24−6=18). Of the sixty four possible addresses designated by the various combinations of the six host bits, thirty eight are used to address the end devices and one (e.g., host_ID 0) is used to address the Switch SW3. Twenty five addresses remains unused. Among the Switch prefix bits, in this example eight are used for the Fabric prefix, having value '0000 0001', and the remaining ten are used for the Switch_ID, having value '0000 0000 01'.

According to various alternative embodiments, the Fabric prefix is set to a specified size (e.g. eight bits wide) or it can be configured to any size, provided a sufficient number of bits are set aside for the Switch_ID field. This means that the number of bits in the Switch_ID field is flexible and is determined by the number of host bits needed by the Switch and the size of the Fabric prefix. In other embodiments of the invention, however, the number of bits in Switch_ID field can be fixed and the number of bits in the Fabric prefix can be flexible. Alternatively, both the Fabric Prefix and the Switch_ID fields can be variable or set to a fixed length (e.g., five bits wide each). As an example, a Fabric with a lot of Switches may be identified by a three bits long Fabric prefix, to leave more address space to identify Switches. A smaller Fabric may be identified by a longer Fabric prefix because it needs less address space to identify the Switches.

In current Fibre Channel Fabrics, the protocol used to compute the routing information needed to route frames between the Switches in the Fabric (routing protocol), is based on Domain_IDs and is called FSPF. When the FSPF protocol is implemented, a routing table is constructed that defines the Domain_ID and Port along the best path to each Switch in the Fabric. When an intra-switch communication having the domain controller address format (FF-FC-Domain_ID) is received, the Domain_ID is extracted and the communication is forwarded along the Port defined by the best path toward that Switch in the routing table.

With the present invention, the Domain_IDs have been replaced by a variable length Switch prefix. Accordingly, the FSPF protocol as defined herein, can not be used. Rather, the well known OSPFv3 or the IS-IS routing protocols may be adapted to Fibre Channel and used to construct a Fibre Channel routing table, or FSPF may be enhanced to convey prefixes information. Switch-to-Switch communications is then handled using the FC_ID that identifies a specific Switch without any need of special address format such as the domain controller address format mentioned above. For more information on the OSPFv3 or IS-IS routing protocols, see respectively the IETF document RFC 2740 and RFC 1142, incorporated herein by reference.

One feature achieved by updating the routing protocol as described above is to scale the other Fibre Channel control protocols to an environment composed of interconnected Fabrics. An intra-Fabric routing protocol suitable for use in an environment of interconnected Fabrics needs to be hierarchical, in the sense that it has to provide a way to differentiate between intra-Fabric and inter-Fabric routes in the routing messages. Both OSPFv3 and IS-IS are hierarchical, and FSPF may be enhanced to support this capability. The hierarchical routing protocol is then the foundation to make hierarchical also the remaining Fibre Channel protocols.

A Switch participating in a hierarchical routing protocol is in fact able to distinguish the prefixes (and so the Switches) belonging to its own Fabric from the prefixes belonging to different Fabrics, because the first ones are announced by the routing protocol as intra-Fabric routes, while the latter ones are announced as inter-Fabric routes. The Switch may then continue to use the existing databases and notification protocols for the intra-Fabric communication, while implementing new inter-Fabric protocols for the selected allowed inter-Fabric communications.

Referring to FIG. 5A, a Fibre Channel routing table 20 constructed using either the OSPFv3 or IS-IS routing protocols is shown. The table 20 includes a first column 22 used to identify the variable length Switch prefix of each Switch in the Fabric 10, a second column 24 used to mark the entry as internal (intra-Fabric) or external (inter-Fabric), and a third column 26 used to identify the Port (or Ports) along the best path to the corresponding Switch. In this example, the table 20 is for Switch SW1. Given that FIG. 1A represents a single Fabric, all the entries are marked internal ("I"). The port entry for the Switch SW1 is "self", indicating that any communication matching the Switch prefix SW1 as the destination has reached its destination. The entry for the Switch prefix SW2 is Port A, indicating that the best path from Switch SW1 to Switch SW2 is through Port A. Similarly, the entry for the Switch prefix SW3 is Port B, indicating that the best path from Switch SW1 to Switch SW3 is through Port B. In order to select the appropriate path, the routing table 20 shall be searched using a longest prefix match algorithm. According to the present invention, a similar table 20 is constructed for each of the Switches SW in the Fabric 10. In the aggregate, the routing tables for the Switches SW1-SW3 enable Switch-to-Switch and end device to end device communication within the Fabric 10.

In respect to the routing tables computed currently by FSPF, in which each entry contains a fixed length Domain_ID and one (or more) exit ports, each entry of the routing tables populated according to the present invention contains an indication of whether the route is internal or external, a variable length Switch Prefix, and one (or more) exit ports. In addition, while the routing tables computed today by FSPF may be searched using an exact match lookup technique, the routing tables populated according to the present invention are searched with a longest prefix match algorithm.

In operation, the routing table represented in FIG. 5A is encoded in a forwarding table for the switching logic 46 of FIG. 1B. FIG. 5B represents the correspondent forwarding table. As shown, the structure of a forwarding table constructed according to the present invention is very similar to the structure of the forwarding table constructed by current Switches (depicted in FIG. 1C), with the main difference being the support of variable length prefixes rather than fixed length Domain_IDs. Accordingly, the switching logic of a Switch constructed using the present invention should search the forwarding table using a longest prefix match algorithm rather than an exact match lookup technique.

Figure 6:
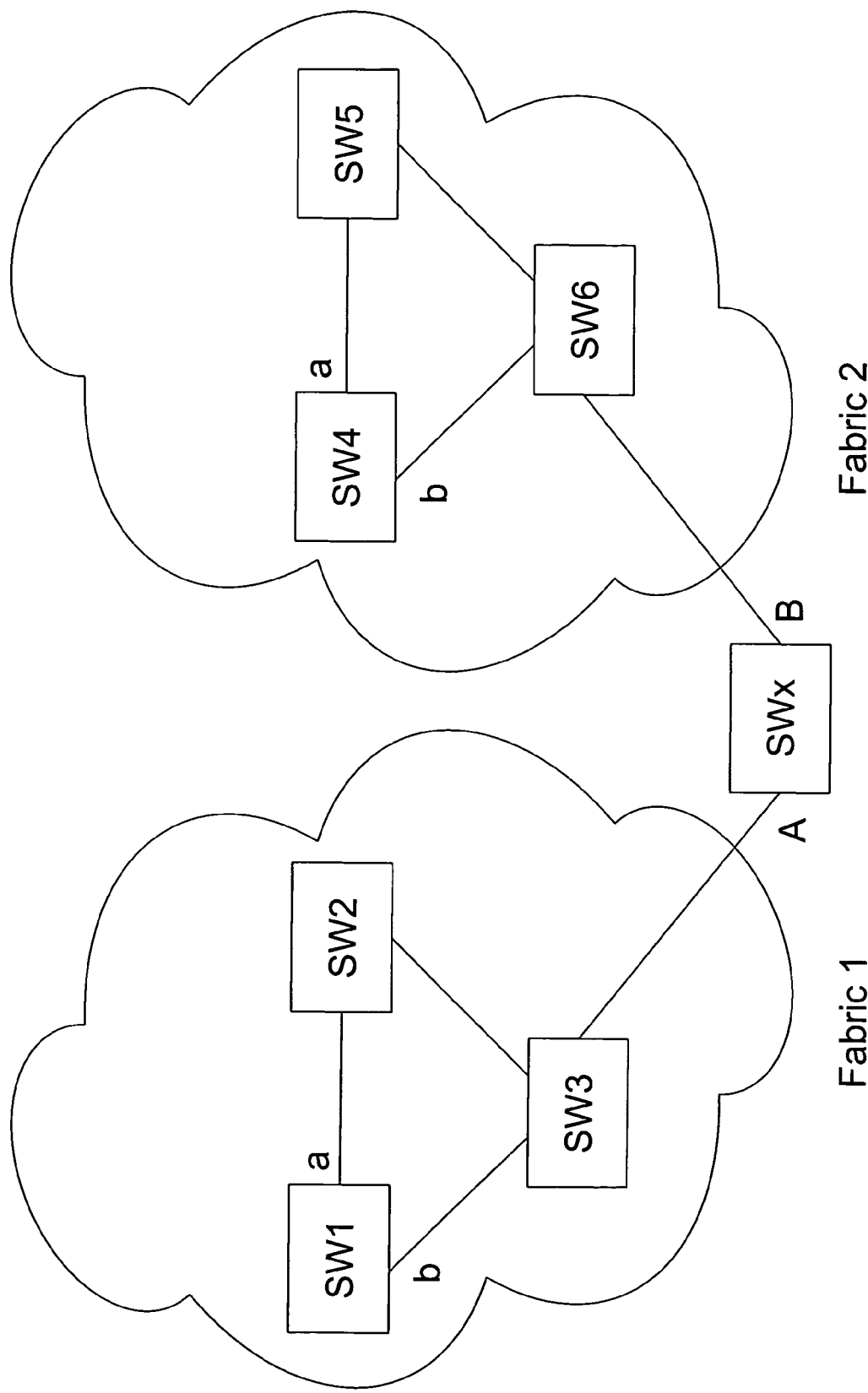
FIG. 6 is a diagram of a Gateway which facilitates inter-Fabric communication according to the present invention.

Referring to FIG. 6, a diagram of a Switch which facilitates inter-Fabric communication according to the present invention, also denoted with the name 'Gateway', is shown. The Switch 30 may implement a version adapted to Fibre Channel of an External Gateway Protocol, such as a BGP4+, for handling communication between Fabric 1 and Fabric 2. The BGP4+ routing protocol is described in the IETF documents RFC 1771 and RFC 2858, both incorporated by reference herein for all purposes. Its main purpose is to establish paths and routes based on policies across different administrative domains. In one embodiment of the present invention, the BGP4+ protocol is used for routing traffic across different Fabrics.

By way of example, assume that a first fabric "Fabric 1" is identified by the Fabric Prefix '0000 0001' and a second fabric "Fabric 2" is identified by the Fabric Prefix '0000 0010'. Two prefixes therefore need to be assigned to Gateway 30, one belonging to Fabric 1 and the other belonging to Fabric 2. Further assume that: (i) Gateway 30 has Switch Prefix '0000 0001 0000 0000 10' in Fabric 1 and Switch Prefix '0000 0010 0000 0000 10' in Fabric 2; (ii) Switches SW1, SW2, and SW3 have prefixes '0000 0001 0000 0000 0000 1', '0000 0001 0000 0000 0001', and '0000 0001 0000 0000 01' respectively and that Switches SW4, SW5, and SW6 have prefixes '0000 0010 0000 0000 0000 1', '0000 0010 0000 0000 0001', and '0000 0010 0000 0000 01' respectively; and (iii) finally, assume that Gateway 30 has to facilitate inter-Fabric communications among some end devices connected to Switch SW1 in Fabric 1, and Switch SW4 in Fabric 2.

FIG. 7A is a schematic representation of the routing table of Gateway 30 for the example provided above. As shown, each prefix is associated with the Fabric to which it belongs, indicated in the second column of the table. In operation this routing table is encoded in a forwarding table for the gateway's switching logic, and the correspondent forwarding table is represented in FIG. 7B. As shown, there is no difference in the forwarding table structure between a gateway and a Switch (as per FIG. 5B), and this is implies that the switching logic of a Switch or of a gateway may be exactly the same. The difference between these two entities may be only on the control plane, not in the data plane. In this more detailed context, the inter-Fabric routing protocol (e.g., BGP4+) purpose is to propagate the inter-Fabric reachability information among gateways interconnecting different Fabrics.

FIGS. 7C and 7D represent respectively the routing tables for Switches SW1 and SW4. As shown, the fourth row contains the entry that identifies Switch SWx respectively in Fabric 1 and Fabric 2, while the fifth row contains an external route, for inter-Fabric communication. In FIG. 7C (representing a Fabric 1 routing table) it provides the reachability information for Switch SW4, that belongs to Fabric 2. In FIG. 7D (representing a Fabric 2 routing table) it provides the reachability information for Switch SW1, that belongs to Fabric 1.

An alternative embodiment of this invention is implemented by the application of the hierarchical routing protocols to the current FC_ID assignment model. This may allow re-using existing hardware (i.e., existing switching logics) with an updated control plane to provide better scalability properties to the current suite of Fibre Channel control protocols. The invention remains as described, but with 8 bits long fixed length prefixes (which reduce to Domain_IDs). This particular embodiment, having fixed length prefixes, allows the use of an exact match lookup technique to search the routing or forwarding tables, instead than requiring the longest prefix match algorithm.

Although illustrative embodiments and applications of this invention are shown and described herein, many variations and modifications are possible which remain within the concept, scope, and spirit of the invention, and these variations would become clear to those of ordinary skill in the art. For example, the present invention may be used also in Fabrics that implements extended addressing, i.e. in Fabrics that extend the address space by including in the FC header also a source Fabric_ID and a destination Fabric_ID in addition to the source and destination FC_IDs. Accordingly, the present embodiments are to be considered as illustrative and not restrictive, and the invention is not to be limited to the details given herein, but may be modified within the scope and equivalents of the appended claims.

What is claimed is:

1. An apparatus comprising,
  a Switch configured to be a switching component in a switching Fabric, the Switch being configured to be addressed within the switching Fabric by an address within an address space of a predefined number of bits, wherein the address space of the predefined number of bits includes:
  a configurable number of host bits sufficient to address the end devices coupled to the Switch; and
  a configurable number of prefix bits used to identify the Switch in the switching Fabric, wherein a sum of the configurable number of host bits and the configurable number of prefix bits is equal to the predefined number of bits, wherein the predefined number of bits is dynamically allocated such that the configurable number of host bits and the configurable number of prefix bits are established.

2. The apparatus of claim 1, wherein the number of prefix bits used to identify the Switch is dynamically set by subtracting the number of host bits from the predefined number of bits in the address space.

3. The apparatus of claim 1, wherein the number of prefix bits is dynamically allocated such that the prefix bits are sub-divided into:
  a first sub-set of bits used to identify the switching Fabric (Fabric prefix); and
  a second sub-set of bits used to identify the Switch in the switching Fabric (Switch_ID).

4. The apparatus of claim 3, wherein the Fabric prefix is of a fixed length such that a number of bits in the second sub-set of bits used to identify the Switch is dynamically set by subtracting the configurable number of host bits and a number of bits in the Fabric prefix from the predefined number of bits.

5. The apparatus of claim 4, wherein the Switch-to-Switch communication protocol comprises one of, but is not limited to, an enhanced version of FSPF or Fibre Channel adapted versions of the following protocols: OSPFv3, IS-IS.

6. The apparatus of claim 3, wherein the Fabric prefix is of a variable length such that a sum of a number of bits in the first sub-set of bits used to identify the Fabric prefix, a number of bits in the second sub-set of bits used to identify the Switch_ID, and the configurable number of host bits is equal to the predefined number of bits.

7. The apparatus as recited in claim 3, wherein the Switch_ID is of a fixed length.

8. The apparatus as recited in claim 3, wherein the Switch_ID is of a variable length such that a number of bits used to represent the Switch_ID is allocated when the predefined number of bits are allocated.

9. The apparatus as recited in claim 3, wherein the Switch_ID is of a fixed length and the Fabric prefix is of a variable length such that a number of bits used to represent the Fabric prefix is allocated when the predefined number of bits are allocated.

10. The apparatus as recited in claim 3, wherein the Switch_ID is of a variable length and the Fabric prefix is of a fixed length.

11. The apparatus as recited in claim 3, wherein the number of host bits is dynamically configurable in response to user input and a number of the first sub-set of bits in the Fabric prefix is dynamically configurable in response to user input.

12. The apparatus as recited in claim 3, wherein the number of host bits is dynamically configurable in response to user input and a number of the second sub-set of bits used to identify the Switch_ID is dynamically configurable in response to user input.

13. The apparatus of claim 1, wherein the Switch is further configured to implement a hierarchical Switch-to-Switch communication protocol to enable the Switch to communicate with other Switches in the same switching Fabric, or in other switching Fabrics.

14. The apparatus of claim 1, wherein the configurable number of host bits is sufficient to address the end devices coupled to the Switch and the Switch itself.

15. The apparatus of claim 1, wherein the Switch is further configured to implement an external gateway protocol so that an end device in the switching Fabric can communicate through the Switch with an end device or a Switch in another switching Fabric.

16. The apparatus of claim 15, wherein the external gateway protocol is the BGP protocol.

17. The apparatus as recited in claim 1, wherein the number of host bits is dynamically configurable in response to user input and the number of prefix bits is dynamically configurable in response to user input.

18. The apparatus of claim 1, wherein the number of prefix bits is sub-divided into:
  a first sub-set of bits used to identify the switching Fabric (Fabric prefix); and
  a second sub-set of bits used to identify the Switch in the switching Fabric (Switch_ID).

19. The apparatus of claim 18, wherein the Fabric prefix is of a fixed length.

20. The apparatus of claim 18, wherein the Fabric prefix is of a variable length.

* * * * *